(12) United States Patent
Kam

(10) Patent No.: US 7,880,939 B2
(45) Date of Patent: Feb. 1, 2011

(54) FILM HOLDER AND FLATBED TYPE IMAGE SCANNER

(75) Inventor: Sing Ngai Kam, Johor Bahru (MY)

(73) Assignee: Seiko Epson Corporation, Tokyo (JP)

( * ) Notice: Subject to any disclaimer, the term of this patent is extended or adjusted under 35 U.S.C. 154(b) by 1010 days.

(21) Appl. No.: 11/711,587

(22) Filed: Feb. 26, 2007

(65) Prior Publication Data

US 2007/0272576 A1 Nov. 29, 2007

(30) Foreign Application Priority Data

Feb. 27, 2006 (JP) .............................. 2006-049819

(51) Int. Cl.
*H04N 1/04* (2006.01)
(52) U.S. Cl. ...................... 358/474; 358/487; 358/506; 358/497
(58) Field of Classification Search ................ 358/474, 358/487, 506, 497, 498
See application file for complete search history.

(56) References Cited

U.S. PATENT DOCUMENTS 7,391,543 B2 6/2008 Ohara

FOREIGN PATENT DOCUMENTS

| JP | 56-072459 | | 6/1981 |
|---|---|---|---|
| JP | 2005-070291 | * | 3/2005 |
| JP | 2005-191736 | | 7/2005 |
| JP | 2006-41713 | | 2/2006 |

* cited by examiner

*Primary Examiner*—Houshang Safaipour
(74) *Attorney, Agent, or Firm*—John J. Penny V; Nutter McClennen & Fish LLP

(57) ABSTRACT

A film holder is adapted to be placed on a manuscript table of a flatbed type image scanner. The film holder includes: a main body, adapted to hold a film on the manuscript table; and a spacer, configured for changing a distance between the film and the manuscript table, and removably attached to the main body by a snap fit.

7 Claims, 7 Drawing Sheets

FILM HOLDER AND FLATBED TYPE IMAGE SCANNER

BACKGROUND

1. Technical Field

The present invention relates to a film holder and a flatbed type image scanner, and relates in particular to a position adjustment of a film to be read.

2. Related Art

There is a related image scanner for reading an image recorded on a film by a silver salt camera or the like (for example, refer to JP-A-2005-70291 and JP-A-2005-191736). In order to read the image recorded on the film at a high resolution, it is necessary to position the film within a depth of field of an image optical system of the image scanner.

However, due to reasons such as a manufacturing tolerance of the image scanner, a dimensional change accompanying a temperature change, and a dimensional change accompanying aging degradation, it is difficult to realize a structure in which the film is positioned within the depth of field of the optical system without an adjustment. Also, in the event that a user is caused to carry out a position adjustment of the film, a structure enabling the adjustment by an easy operation is preferable.

SUMMARY

An advantage of some aspects of the invention is to provide a film holder and a flatbed type image scanner in which it is possible to adjust a position of a film within a depth of field of an optical system by an easy operation.

According to an aspect of the invention, there is provided a film holder adapted to be placed on a manuscript table of a flatbed type image scanner, the film holder comprising:
- a main body, adapted to hold a film on the manuscript table; and
- a spacer, configured for changing a distance between the film and the manuscript table, and removably attached to the main body by a snap fit.

The present disclosure relates to the subject matter contained in Japanese patent application No. 2006-049819 filed on Feb. 27, 2006, which is expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 2:
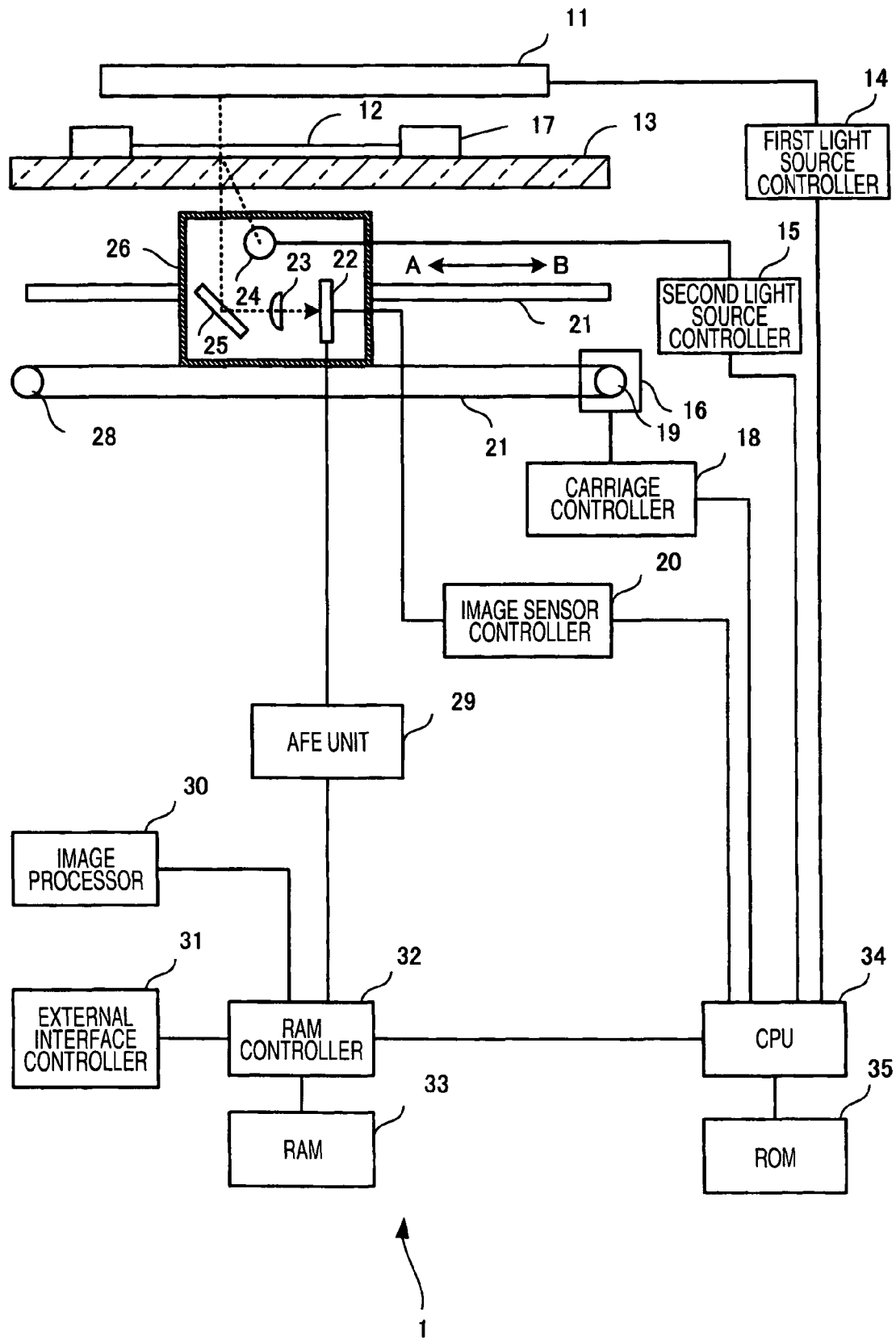
FIG. 2 is a block diagram related to the working example of the invention.

Hereafter, a description will be given of an embodiment of the invention, based on a working example. FIG. 2 is a schematic diagram showing an image scanner 1 as a working example of an image reading apparatus according to the invention. The image scanner 1 is of a so-called flat bed type which reads a manuscript placed on a flat manuscript table 13.

The manuscript table 13 is formed of a transparent plate such as a glass plate. A reflective manuscript such as a printed document, a photograph or a book, or a film holder 17 holding a film 12 such as a 35 mm strip film, is placed on a flat board surface of the manuscript table 13. The film holder 17 is formed by an injection molding of a resin such as a plastic. When the film holder 17 holding the film 12 is placed on the manuscript table 13, the film 12 is positioned within a depth of field of an optical system.

A carriage 26 is fitted slidably onto a guide rod 21 which is parallel to the board surface of the manuscript table 13. A reflective manuscript illumination unit 24, a mirror 25, a lens 23 and an image sensor 22 are mounted on the carriage 26. The mirror 25 and the lens 23 cause a transmitted light of a manuscript illuminated by a transmissive manuscript illumination unit 11, and a reflected light of the manuscript illuminated by the transmissive manuscript illumination unit 11, to fall incident on a light receiving surface of the image sensor 22. The carriage 26, being pulled by a belt 21 wound around pulleys 28 and 19 which are driven by a transport motor 16, reciprocates in directions of an arrow AB, parallel to the board surface of the manuscript table 13. When the mirror 25, the lens 23 and the image sensor 22 are conveyed by the carriage 26 in the directions of the arrow AB parallel to the board surface of the manuscript table 13, a main scanning range which reads the manuscript moves.

The transmissive manuscript illumination unit 11 is provided on an opposite side of the manuscript table 13 to the carriage 26. The transmissive manuscript illumination unit 11 includes a not-shown light source, light guide plate and reflector, and a housing which houses them. The housing is swingably connected by a hinge or the like to a not-shown lower portion housing in which the carriage 26 etc. are stored. The transmissive manuscript illumination unit 11 is provided in such a way that a longitudinal direction axis line thereof extends parallel to a longitudinal direction axis line of the guide rod 21. The transmissive manuscript illumination unit 11 illuminates the film 12, held in the film holder 17 positioned in a prescribed position on the manuscript table 13, with a uniform illuminance.

The image sensor 22 is a so-called linear image sensor of a lens reduction type in which multiple not-shown photoelectric conversion elements, configured of a photo diode or the like, are linearly arranged. The image sensor 22 is mounted on the carriage 26 in a state in which the multiple photoelectric conversion elements are arranged parallel to a central axis line of the reflective manuscript illumination unit 24 including a fluorescent tube lamp or the like. It is also acceptable that the image sensor 22 and an image optical system are configured as a contact type image sensor including a SELFOC lens array. A focal depth of the SELFOC lens array is less than a focal depth of a reduction image optical system. For this reason, an advantage of a height adjustment mechanism of the film holder 17 described in the working example is particularly remarkable in a scanner including the contact type image sensor. An image sensor controller 20, being a drive circuit which transmits a drive pulse necessary for driving the image sensor 22 to the image sensor 22, includes, for example, a synchronized signal generator, a drive timing generator, or the like.

A CPU 34 controls each portion of the image scanner 1 by executing a program stored in a ROM 35, which is a nonvolatile memory medium. A RAM 33 is a volatile memory medium which temporarily stores various kinds of program and data. A RAM controller 32 controls a transfer of data between the CPU 34, an AFE unit 29, an image processor 30, an external interface controller 31 and the like, and the RAM 33. A carriage controller 18 includes a not-shown transport motor drive circuit, control circuit and the like. The carriage controller 18 receives a carriage transport control signal transmitted from the CPU 34, and controls a rotation direction, a rotation speed and the like of the transport motor 16.

A first light source controller 14, including a not-shown inverter circuit, control circuit and the like, controls a turning on and turning off of the transmissive manuscript illumination unit 11. A second light source controller 15, including the inverter circuit, control circuit and the like, controls the turning on and turning off of the reflective manuscript illumination unit 24. The analog front end (AFE) unit 29 stores a scanned image digitalized by carrying out a CDS (Correlated Double Sampling) process, an optical black clamp control for recreating a black level of an image, an electrical signal level adjustment process carried out by adjusting again of an electrical signal of the image, a quantizing process and the like, in the RAM 33 via the RAM controller 32.

The image processor 30 is a DSP (Digital Signal Processor) which carries out, in conjunction with the CPU 34, a signal processing for conducting an image processing such as a gamma correction or a shading correction, on the scanned image stored in the RAM 33. The external interface controller 31 is connected so as to enable communication between the image scanner 1 and an external system such as a PC (Personal Computer).

Figure 3A:
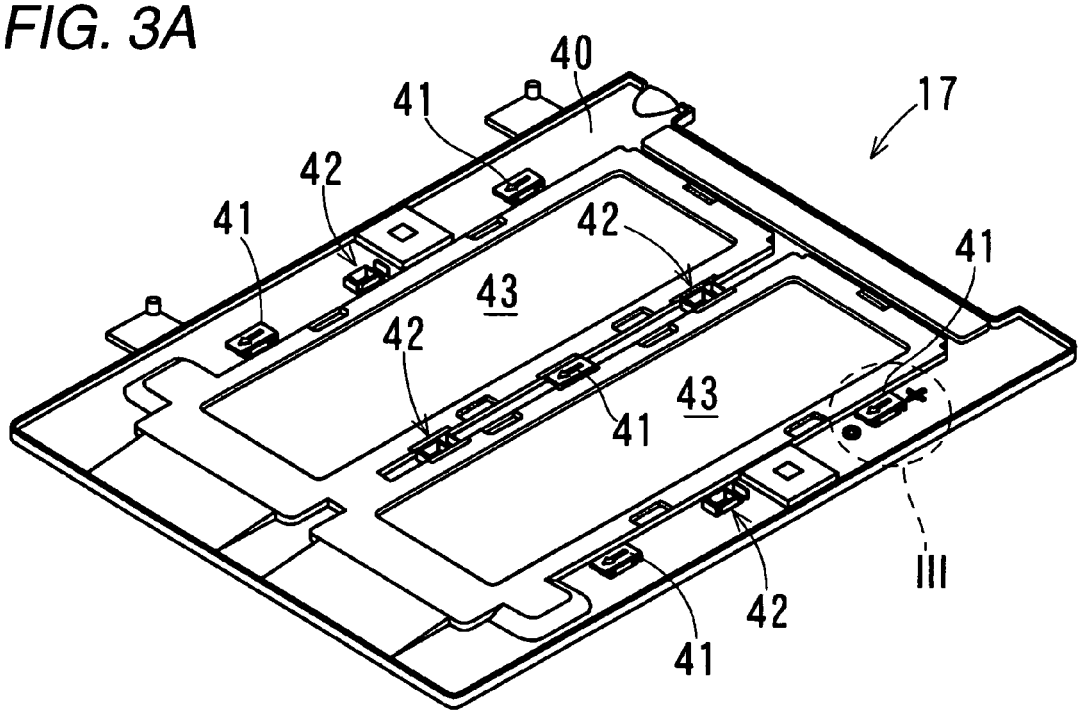
FIG. 3A is a perspective view related to the working example of the invention.
Figure 3B:
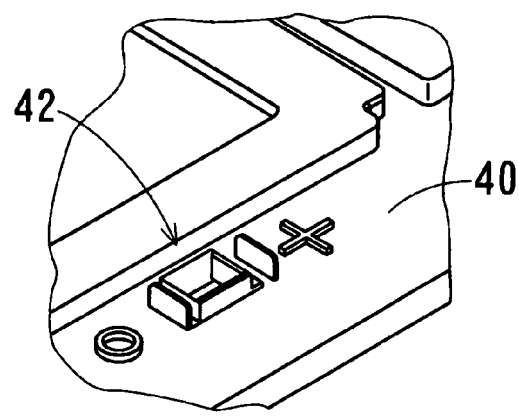
FIG. 3B is a perspective view related to the working example of the invention.
Figure 3C:
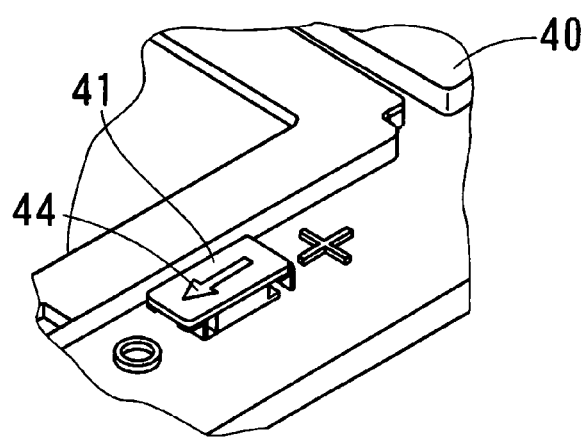
FIG. 3C is a perspective view related to the working example of the invention.
Figure 3D:
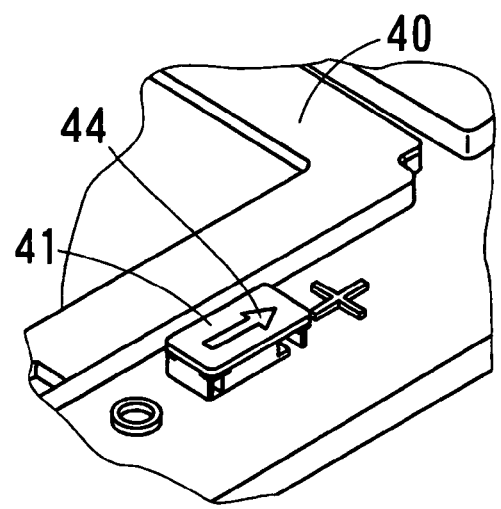
FIG. 3D is a perspective view related to the working example of the invention.

Heretofore, an outline has been described regarding a whole configuration of the image scanner 1 as the image reading apparatus. Next, a detailed description will be given of the film holder 17. FIG. 3A is a perspective view depicting a first surface side, which faces the manuscript table 13 when the film holder 17 is being used, facing upward. The film holder 17 is used in any condition of a first condition shown in FIG. 1C, a second condition shown in FIG. 1B, or a third condition shown in FIG. 1A. A distance between the film 12 held in the film holder 17 and the manuscript table 13 becomes smaller in an order of the first condition, the second condition, the third condition. There being no particular restriction on a quantity of spacers 41 for adjusting the distance between the film 12 held in the film holder 17 and the manuscript table 13, as long as there are two or more, it is possible to design appropriately in such a way that a main body 40 can be securely supported in a position parallel to the manuscript table 13. The first condition and the second condition are conditions in which a plurality of the spacers 41 are attached to spacer attachment portions 42 of the main body 40. In the first condition and the second condition, a direction in which the spacers 41 are attached to the main body 40 is reversed. A user can distinguish between the first condition and the second condition by means of an arrow mark 44 formed on the spacers 41. The third condition is a condition in which the spacers 41 are removed from the main body 40.

Figure 4A:
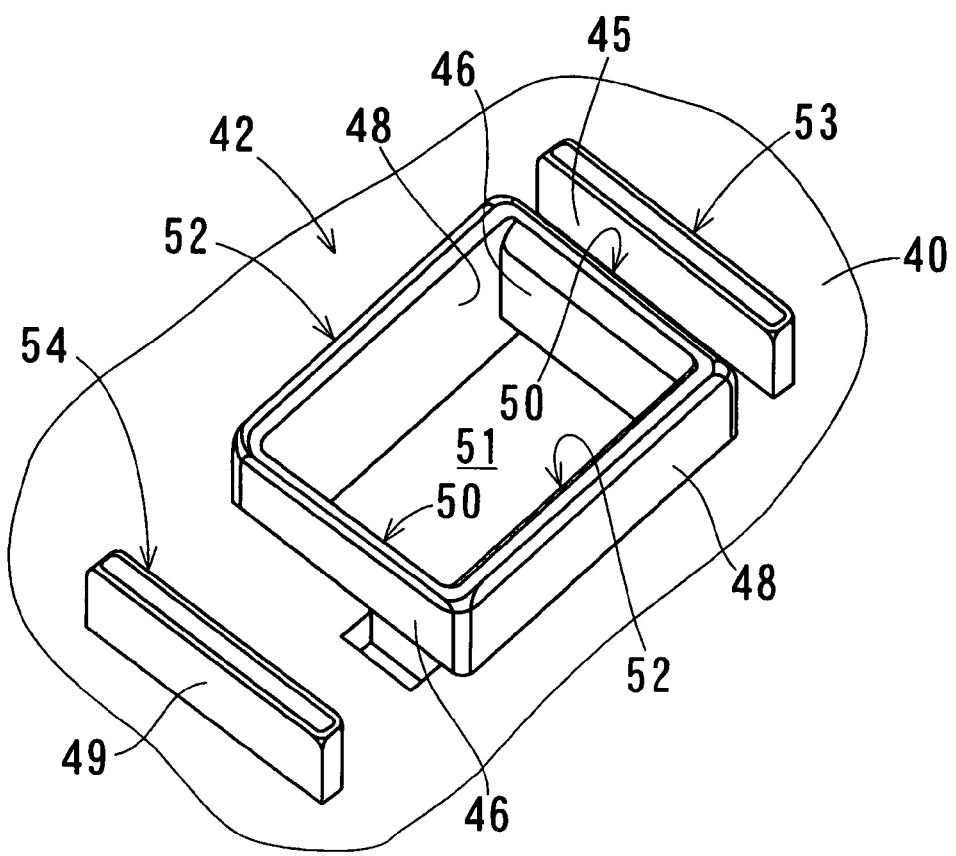
FIG. 4A is a perspective view related to the working example of the invention.
Figure 4B:
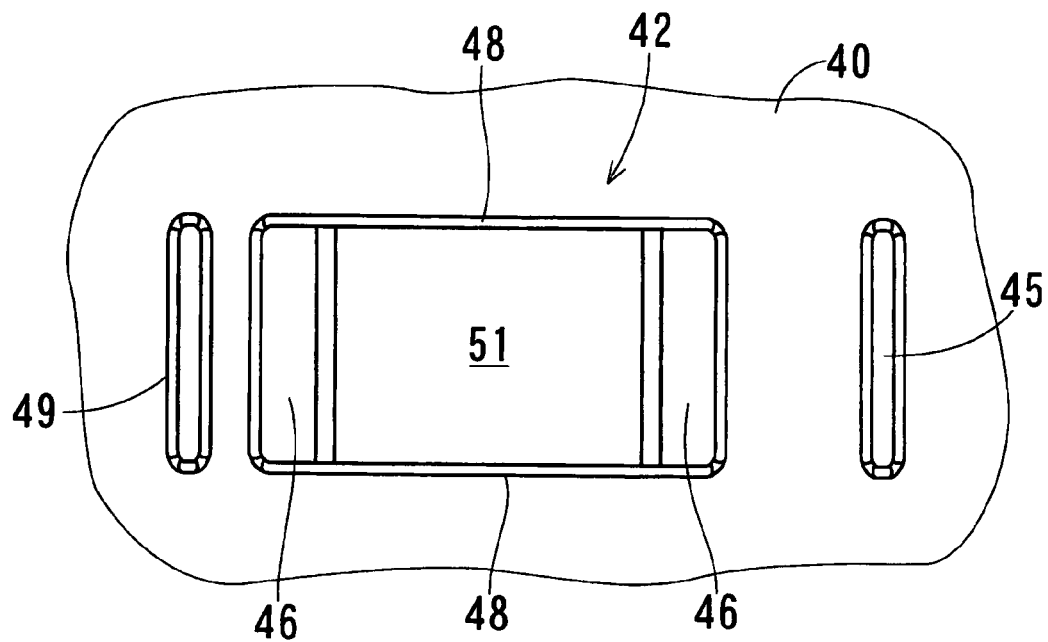
FIG. 4B is a plan view related to the working example of the invention.

FIG. 4A is a perspective view of the spacer attachment portion 42 seen from the first surface side of the main body 40 facing the manuscript table 13. FIG. 4B is a plan view of the spacer attachment portion 42 seen from the first surface side of the main body 40 facing the manuscript table 13. A plurality of insertion holes 51 for holding the spacers 41 are formed in the main body 40 of the film holder 17. On the first surface of the main body 40, a perimeter of each insertion hole 51 is surrounded by two mutually parallel positioning walls 48, and two mutually parallel ribs 46. On the first surface of the main body 40 of the film holder 17, end surfaces 52 of the positioning walls 48 are higher than end surfaces 50 of the ribs 46, and are a highest formation on the first surface. Consequently, in the condition in which each spacer 41 is removed from the main body 40, the end surfaces 52 of the positioning walls 48 come into contact with the manuscript table 13. Two positioning ribs 45 and 49, which sandwich the two ribs 46 between them, are formed mutually parallel. On the first surface of the main body 40 of the film holder 17, end surfaces 53 and 54 of the positioning ribs 45 and 49 are lower than the end surfaces 52 of the positioning walls 48.

Figure 5:
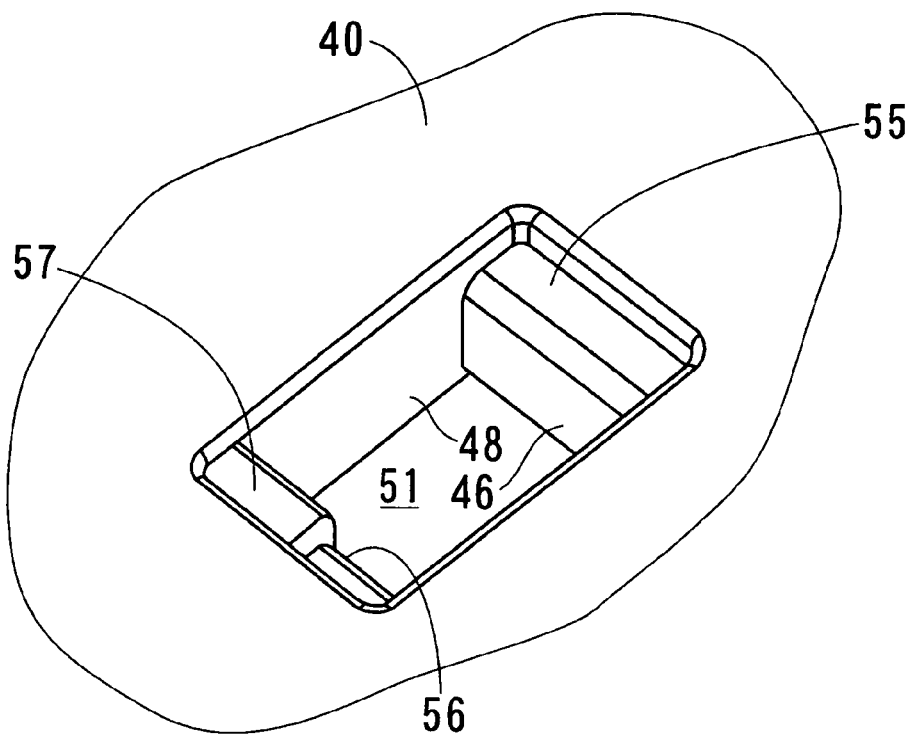
FIG. 5 is a perspective view related to the working example of the invention.

FIG. 5 is a perspective view of the spacer attachment portion 42 seen from a second surface side, which corresponds to a back surface of the first surface facing the manuscript table 13. A first depression 57, a second depression 55 and a third depression 56, for latching the spacer 41 to the main body, are formed in positions neighboring the insertion holes 51 in the second surface of the main body 40. A height in the second surface of the main body 40 of the film holder 17 decreases in an order of a bottom surface of the first depression 57, a bottom surface of the second depression 55, and a bottom surface of the third depression 56. A surface of each of the first depression 57, the second depression 55 and the third depression 56 which is perpendicular to a thickness direction of the main body 40 is referred to as the bottom surface.

Figure 1A:
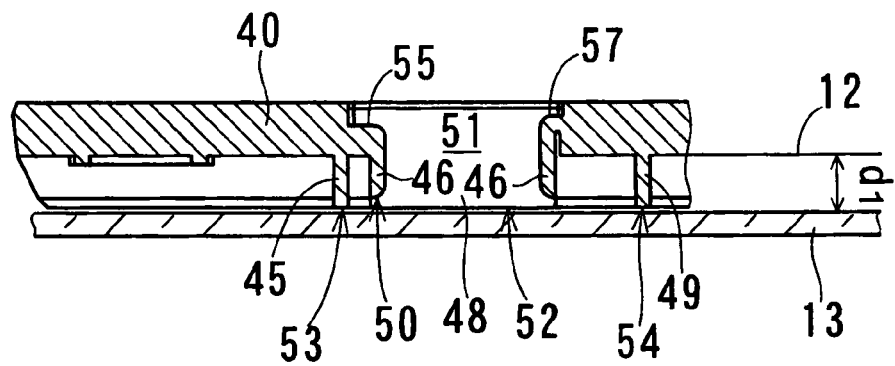
FIG. 1A is a sectional view related to a working example of the invention.
Figure 1B:
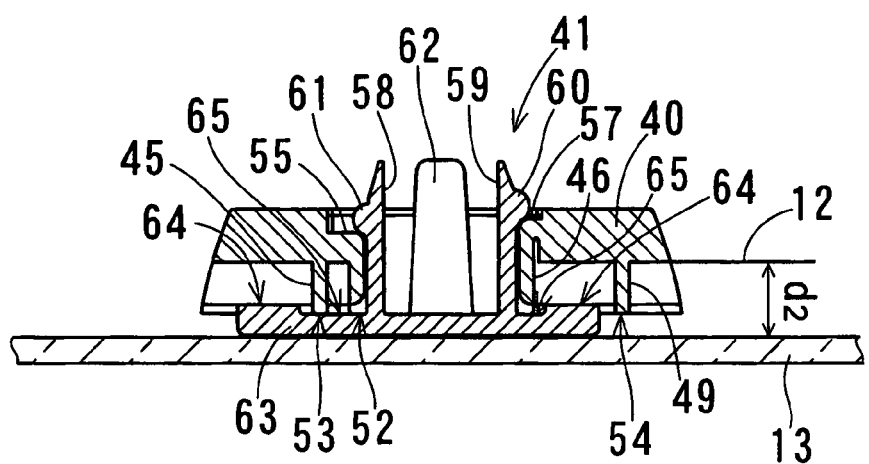
FIG. 1B is a sectional view related to the working example of the invention.
Figure 1C:
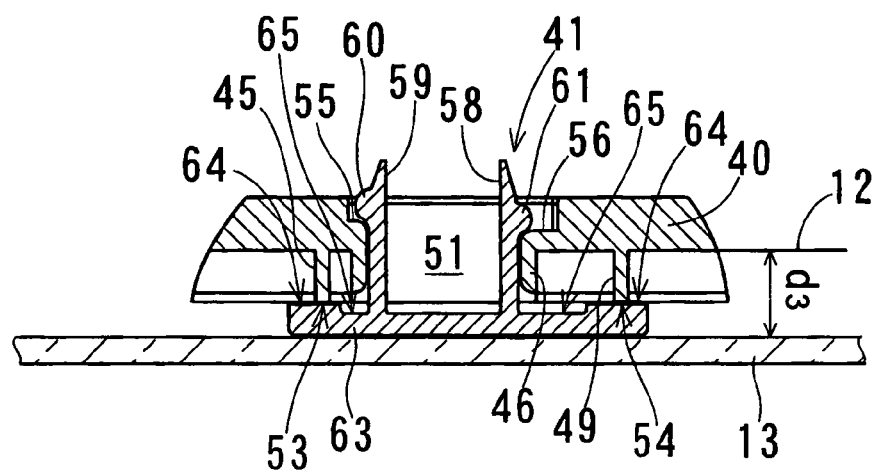
FIG. 1C is a sectional view related to the working example of the invention.

FIGS. 1A, 1B and 1C are sectional views showing the third condition, the second condition and the first condition of the film holder 17, respectively. As shown in FIG. 1A, in the third condition, in which each spacer 41 is removed from the main body 40, the end surfaces 52 of the positioning walls 48, which are the highest formation on the first surface, come into contact with the manuscript table 13, and the main body 40 of the film holder 17 is directly supported by the manuscript table 13. As shown in FIGS. 1B and 1C, the spacer 41 is of a structure which can be attached to the main body 40 of the film holder 17 in such a way as to be removable by a snap fit. Here, the snap fit is a fastening method by taking advantage of elasticity.

A stopper 63 of the spacer 41, being plate-shaped, is a portion which comes into contact with the manuscript table 13, and supports the main body 40. An upper step portion 64, and a lower step portion 65 which is lower than the upper step portions 64, are formed on a first surface of the stopper 63 facing the main body 40. In the first condition, the upper step portion 64 is a portion which is brought into contact with the end surface 53 of the positioning rib 45 and the end surface 54 of the positioning rib 49. In the second condition, the lower step portion 65 is a portion which is brought into contact with the end surfaces 52 of the positioning walls 48. This kind of relationship occurs because a length of a portion of the plate-shaped stopper 63 extending from an elastic hook 58 inserted in the insertion hole 51, and a length of a portion extending from an elastic hook 59 inserted in the insertion hole 51, differ from each other, first surface sides of tips of the individual portions form the upper step portion 64, and a distance from the positioning rib 45 to the insertion hole 51, and a distance from the positioning rib 49 to the insertion hole 51, differ from each other. Specifically, it is as follows. In the first condition, a portion of the upper step portion 64 which is farther from an intermediate point of the elastic hook 58 and the elastic hook 59 is brought into contact with the positioning rib 49, which is farther from the insertion hole 51, while a portion of the upper step portion 64 which is nearer the intermediate point of the elastic hook 58 and the elastic hook 59 is brought into contact with the positioning rib 45, which is nearer the insertion hole 51. Meanwhile, in the second condition, the portion of the upper step portion 64 which is farther from the intermediate point of the elastic hook 58 and the elastic hook 59 does not make contact with the positioning rib 45, as it becomes farther from the insertion hole 51 than the positioning rib 45, which is nearer the insertion hole 51, while the portion of the upper step portion 64 which is nearer the intermediate point of the elastic hook 58 and the elastic hook 59 does not make contact with the positioning rib 49, as it becomes nearer the insertion hole 51 than the positioning rib 49, which is farther from the insertion hole 51.

The elastic hooks 58 and 59 protrude from the first surface of the stopper 63 facing the main body 40. In both the first and the second conditions, the elastic hooks 58 and 59 are of a shape which can be inserted in the insertion hole 51. By the elastic hooks 58 and 59 being inserted in the insertion hole 51, and a protruding portion 61 formed in a vicinity of an end portion of the elastic hook 58, and a protruding portion 60 formed in a vicinity of an end portion of the elastic hook 59, fitting into any two of the depressions 55, 56 and 57, the stopper 63 is latched to the main body 40. A height from the stopper 63 of the protruding portion 61 formed in the elastic hook 58 is less than a height from the stopper 63 of the protruding portion 60 formed in the elastic hook 59. Also, as described heretofore, in the second surface of the main body 40, the height decreases in the order of the bottom surface of the first depression 57, the bottom surface of the second depression 55, and the bottom surface of the third depression 56. As there is this kind of relationship between the protruding portions 61 and 60, and the depressions 55, 56 and 57, in both the first and second conditions, it is possible for the protruding portions 61 and 60 to be crimped to the main body 40. Specifically, it is as follows.

In the first condition shown in FIG. 1C, the upper step portion 64 of the stopper 63 is crimped to the end surface 54 of the positioning rib 49 and the end surface 53 of the positioning rib 45, the protruding portion 61 and the bottom surface of the third depression 56 are crimped, and the protruding portion 60 and the bottom surface of the second depression 55 are crimped.

In the second condition shown in FIG. 1B, the lower step portion 65 of the stopper 63 is crimped to the end surfaces 52 of the positioning walls 48, the protruding portion 60 and the bottom surface of the first depression 57 are crimped, and the protruding portion 61 and the bottom surface of the second depression 55 are crimped. In the second condition, the end surface 53 of the positioning rib 45 and the lower step portion 65 of the stopper 63 are not in contact.

As a difference between a height of the upper step portion 64 and a height of the lower step portion 65 on the first surface of the stopper 63 is greater than a difference between a height of the end surfaces 52 of the positioning walls 48 and a height of the end surfaces 53 and 54 of the positioning ribs 45 and 49 on the first surface of the main body 40, in the first condition and the second condition, a distance from the manuscript table 13 to the main body 40 differs (for example, a distance difference is 0.5 mm). Consequently, a distance between the film 12 held in the main body 40 of the film holder 17 and the manuscript table 13 also differs in the first condition and the second condition.

Figure 6:
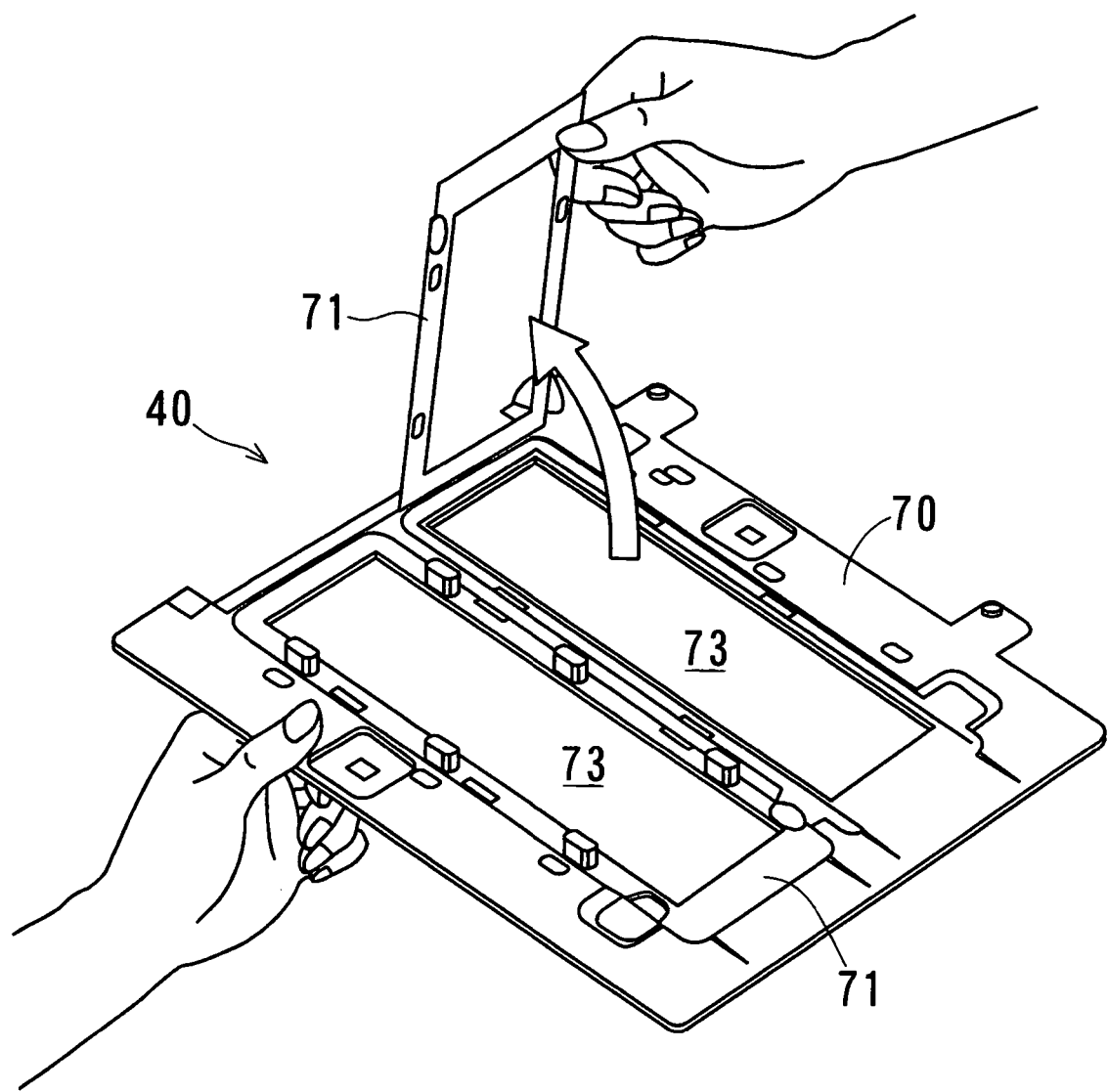
FIG. 6 is a perspective view related to the working example of the invention.
Figure 7:
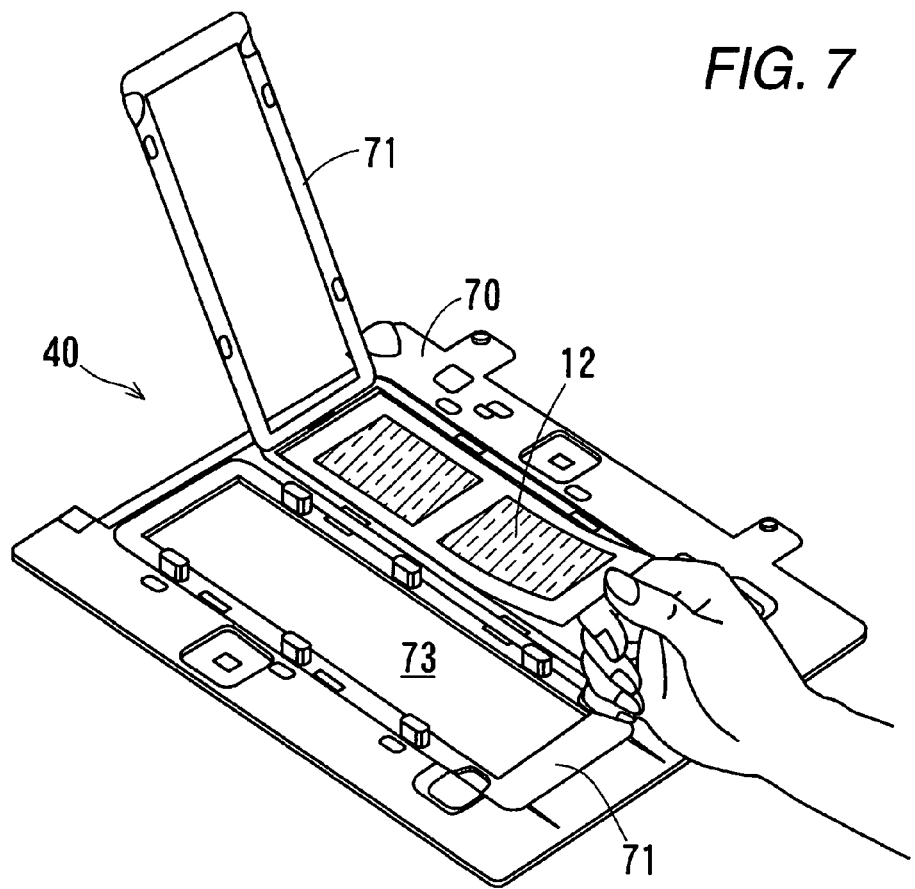
FIG. 7 is a perspective view related to the working example of the invention.
Figure 8:
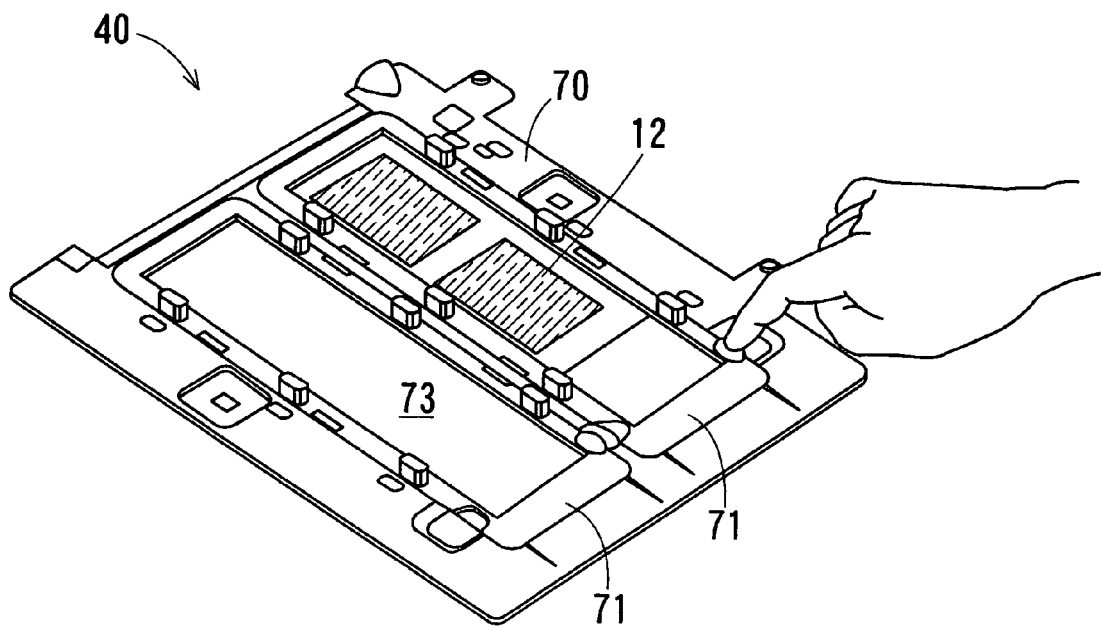
FIG. 8 is a perspective view related to the working example of the invention.

Next, a description will be given of a structure which holds the film 12 in the main body 40. FIGS. 6, 7 and 8 are all perspective views of the main body 40 seen from the second surface (the back surface of the first surface facing the manuscript table 13) of the main body 40. The main body 40 of the film holder 17 includes a plate-shaped base 70, and a frame-shaped cover 71 which is rotatably connected to the base 70. At least one aperture 73, for causing the light emitted from the transmissive manuscript illumination unit 11 to reach the manuscript table 13, is formed in the base 70. As shown in FIG. 7, the film 12 (a hatching portion) is placed on a perimeter of the aperture 73 of the base 70. As shown in FIG. 8, on the cover 71 being closed, and latched to the base 70, the film 12 is held by the main body 40 by the film 12 being tightly sandwiched by the cover 71 and the base 70.

According to the heretofore described working example of the invention, as distances $d_1$, $d_2$ and $d_3$ between the manuscript table 13 and the film 12, in the third condition shown in FIG. 1A, the second condition shown in FIG. 1B, and the first condition shown in FIG. 1C respectively, are different (for example, $d_3-d_2=d_2-d_1=0.5$ mm), it is possible to adjust the distance between the manuscript table 13 and the film 12. Also, as a configuration is such that one kind of the spacer 41 can be attached to the main body 40 in two forms by the snap fit, it is possible to easily switch between conditions. That is, according to the working example of the invention, by a simple operation, it is possible to adjust the position of the film within the depth of field of the optical system. Also, as the portion of the main body 40 crimped to the stopper 63 of the spacer 41 and the portion of the main body 40 in contact with the manuscript table 13 coincide, a dimension control in a manufacturing process of a portion for enabling two usage conditions is easy.

The invention not being limited to the heretofore described embodiment, it can be carried out in various forms without departing from the scope thereof. For example, it is not essential that the configuration of the portion in which the stopper 63 and the main body 40 come into contact includes the plurality of ribs of which the heights of the end surfaces are different from each other, nor is it essential that there is an unevenness in the surface of the main body 40 side of the stopper 63. Also, it is also acceptable, rather than a configuration in which it is possible to switch between three conditions by using the spacer, to have a simpler configuration in which it is possible to switch between two conditions by an attachment and removal of the spacer. Also, a form of holding the film in the film holder not being limited to the form of holding by sandwiching the strip film, a form in which a mount film is held down by an elastic cantilevered area is also acceptable.

According to an aspect of the invention, as the spacer for changing the distance from the film to the manuscript table is attached to the main body which holds the film in such a way as to be removable by the snap fit, it is possible to adjust a position of the film within a depth of field of an image optical system of the flatbed type image scanner by an easy operation. It is acceptable that the distance from the film to the manuscript table changes by changing an attachment condition of one spacer to the main body, and it is also acceptable that the distance from the film to the manuscript table changes by attaching any one of a plurality of kinds of spacer which are mutually different.

According to an aspect of the invention, a height from the manuscript table of a whole main body holding the film changes depending on the spacer.

According to an aspect of the invention, as the distance from the main body to the manuscript table differs between the first condition and the second condition, it is possible to adjust the distance between the film held by the main body and the manuscript table by switching between the first condition and the second condition.

According to an aspect of the invention, as it is possible to change the distance from the film to the manuscript table without replacing the spacer, a handling is easy.

According to an aspect of the invention, by changing the condition in which the elastic hooks of the stopper are inserted into the insertion hole, it is possible to change the distance from the film to the manuscript table with an insertion portion inserted in the insertion hole. Consequently, according to the film holder, it is easy to change the distance from the film to the manuscript table.

According to an aspect of the invention, it is possible to adjust the distance between the manuscript table and the film held by the main body in three stages.

According to an aspect of the invention, as it is possible to bring together a manufacturing tolerance control of a portion which makes contact with the manuscript table and a portion crimped by the spacer, in a condition in which the spacer is removed, it is possible to more accurately control at least two kinds of distance, of three kinds of distance which can be set as the distance from the film to the manuscript table, in a manufacturing process.

According to an aspect of the invention, by changing the condition in which the elastic hooks of the spacer are inserted into the insertion hole, it is possible to change the distance from the film to the manuscript table with an insertion portion inserted in the insertion hole. Consequently, according to the film holder, it is easy to change the distance from the film to the manuscript table.

What is claimed is:

1. A film holder adapted to be placed on a manuscript table of a flatbed type image scanner, the film holder comprising:
   a main body, adapted to hold a film on the manuscript table; and
   a spacer, configured for changing a distance between the film and the manuscript table, and removably attached to the main body by a snap fit;
   wherein the spacer supports the main body in a state in which the spacer is held in contact with the manuscript table; and
   wherein the main body includes a first portion facing the manuscript table and a second portion between the manuscript table and the first portion,
   the spacer is held in contact with the first portion in a first condition,
   the spacer is held in contact with the second portion in a second condition, and
   the distance between the film and the manuscript table differs between the first condition and the second condition.

2. The film holder according to claim 1, wherein
the spacer is attached to the main body in the first condition or the second condition.

3. The film holder according to claim 2, wherein
the main body is formed with an insertion hole, and
the spacer includes a stopper portion adapted to be held in contact with the first portion or the second portion and an elastic hook adapted to be inserted in the insertion hole and held in the first condition or the second condition.

4. The film holder according to claim 1, wherein
the main body includes a contact portion which comes into contact with the manuscript table when the spacer is removed,
the contact portion is held in contact with the manuscript table in a third condition, and
the distance between the film and the manuscript table differs between the first condition, the second condition and the third condition.

5. The film holder according to claim 4, wherein
the contact portion is the second portion.

6. The film holder according to claim 1, wherein
the spacer includes a stopper adapted to be held in contact with the main body and an elastic hook adapted to be inserted in an insertion hole formed with the main body,
the stopper includes a first portion facing the main body and a second portion between the manuscript table and the first portion,
the elastic hook is held in a first condition in which the first portion of the stopper comes into contact with the main body or is held in a second condition in which the second portion of the stopper comes into contact with the main body, and
the distance between the film and the manuscript table differs between the first condition and the second condition.

7. A flatbed type image scanner equipped with the film holder according to claim 1.

* * * * *